United States Patent
Zhou

(10) Patent No.: US 10,341,653 B2
(45) Date of Patent: Jul. 2, 2019

(54) METHOD AND SYSTEM FOR REDUCING SLICE HEADER PARSING OVERHEAD IN VIDEO CODING

(71) Applicant: TEXAS INSTRUMENTS INCORPORATED, Dallas, TX (US)

(72) Inventor: Minhua Zhou, San Diego, CA (US)

(73) Assignee: Texas Instruments Incorporated, Dallas, TX (US)

(*) Notice: Subject to any disclaimer, the term of this patent is extended or adjusted under 35 U.S.C. 154(b) by 167 days.

(21) Appl. No.: 15/295,495

(22) Filed: Oct. 17, 2016

(65) Prior Publication Data

US 2017/0034509 A1 Feb. 2, 2017

Related U.S. Application Data

(63) Continuation of application No. 13/913,291, filed on Jun. 7, 2013, now Pat. No. 9,473,769.

(Continued)

(51) Int. Cl.
| | |
|---|---|
| *H04N 7/12* | (2006.01) |
| *H04N 11/02* | (2006.01) |
| *H04N 11/04* | (2006.01) |
| *H04N 19/105* | (2014.01) |
| *H04N 19/503* | (2014.01) |
| *H04N 19/46* | (2014.01) |
| *H04N 19/23* | (2014.01) |
| *H04N 19/159* | (2014.01) |

(Continued)

(52) U.S. Cl.
CPC ......... *H04N 19/105* (2014.11); *H04N 19/159* (2014.11); *H04N 19/174* (2014.11); *H04N 19/186* (2014.11); *H04N 19/196* (2014.11); *H04N 19/23* (2014.11); *H04N 19/46* (2014.11); *H04N 19/503* (2014.11)

(58) Field of Classification Search
None
See application file for complete search history.

(56) References Cited

U.S. PATENT DOCUMENTS

| | | | |
|---|---|---|---|
| 2009/0116760 A1* | 5/2009 | Boon | H04N 19/105 382/238 |
| 2012/0230397 A1 | 9/2012 | Quedraogo et al. | |

(Continued)

OTHER PUBLICATIONS

Philippe Bordes, "Weighted Prediction", JCTVC-F265, Joint Collaborative Team on Video Coding (JCT-VC) of ITU-T SG16 WP3 and ISO/IEC JTC1/SC29/WG11, pp. 1-14, Jul. 14-22, 2011, Torino, Italy.

(Continued)

*Primary Examiner* — Talha M Nawaz
(74) *Attorney, Agent, or Firm* — Charles A. Brill; Frank D. Cimino

(57) ABSTRACT

A method for encoding a picture of a video sequence in a bit stream that reduces slice header parsing overhead is provided. The method includes determining weighting factors that may be used for weighted prediction in encoding at least one slice of the picture, wherein a total number of the weighting factors is constrained to not exceed a predetermined threshold number of weighting factors, wherein the threshold number is less than a maximum possible number of weighting factors, and signaling weighted prediction parameters including the weighting factors in a slice header in the bit stream.

2 Claims, 7 Drawing Sheets

Related U.S. Application Data

(60) Provisional application No. 61/657,118, filed on Jun. 8, 2012, provisional application No. 61/659,059, filed on Jun. 13, 2012, provisional application No. 61/667,024, filed on Jul. 2, 2012, provisional application No. 61/667,097, filed on Jul. 2, 2012, provisional application No. 61/670,294, filed on Jul. 11, 2012, provisional application No. 61/671,961, filed on Jul. 16, 2012.

(51) Int. Cl.
*H04N 19/174* (2014.01)
*H04N 19/186* (2014.01)
*H04N 19/196* (2014.01)

(56) References Cited

U.S. PATENT DOCUMENTS

| | | | | |
|---|---|---|---|---|
| 2013/0051665 A1* | 2/2013 | Shinozaki | G06T 5/00 | 382/167 |
| 2013/0177084 A1* | 7/2013 | Wang | H04N 19/176 | 375/240.16 |
| 2013/0215974 A1* | 8/2013 | Chong | H04N 19/463 | 375/240.24 |
| 2013/0229485 A1* | 9/2013 | Rusanovskyy | H04N 19/597 | 348/43 |
| 2014/0003503 A1* | 1/2014 | Chen | H04N 19/463 | 375/240.12 |
| 2014/0050264 A1* | 2/2014 | He | H04N 19/70 | 375/240.16 |
| 2014/0079125 A1* | 3/2014 | Tanizawa | H04N 19/105 | 375/240.16 |

OTHER PUBLICATIONS

Philippe Bordes, "Weighted Prediction", JCTVC-F265 presentation, Joint Collaborative Team on Video Coding (JCT-VC) of ITU-T SG16 WP3 and ISO/IEC JTC1/SC29/WG11, pp. 1-11, Jul. 14-22, 2011, Torino, Italy.
Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, pp. 1-215, Mar. 16-23, 2011, Geneva, Switzerland.
Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, pp. 1-217, Jul. 14-22, 2011, Torino, Italy.
Athanasios Leontaris and Alexis M. Tourapis, "Weighted Prediction Methods for Improved Motion Compensation", ICIP'09 Proceedings of the 16th IEEE International Conference on Image Processing, pp. 1029-1032, Mar. 2009.

Il-Koo Kim et al, "High Efficiency Video Coding (HEVC) Test Model 10 (HM10) Encoder Description", JCTVC-L1002_v3, Joint Collaborative Team on Video Coding (JCT-VC) of ITU-T SG16 WP3 and ISO/IEC JTC1/SC29/WG11, pp. 1-39, Jan. 14-23, 2013, Geneva, Switzerland.
Benjamin Bross et al, High Efficiency Video Coding (HEVC) Text Specification Draft 10 (for FDIS & Last Call), JCTVC_L1003_v34, Joint Collaborative Team on Video Coding (JCT-VC) of ITU-T SG16 WP3 and ISO/IEC JTC1/SC29/WG11, pp. 1-298, Jan. 14-23, 2013, Geneva, Switzerland.
"TMS320DM6467 Digital Media System-on-Chip", SPRS403G, Texas Instruments Incorporated, Dec. 2007, revised Oct. 2010, pp. 1-355.
Do-Kyoung Kwon and Hyung J. Kim, "Region-Based Weighted Prediction for Real-Time H.264 Encoder", 2011 IEEE International Conference on Consumer Electronics (ICCE), pp. 47-48, Jan. 9-12, 2011, Las Vegas, NV.
Minhua Zhou and Mihir Mody, "AHG9: On Slice Header Parsing Overhead Reduction", JCTVC-J0083, Joint Collaborative Team on Video Coding (JCT-VC) of ITU-T SG16 WP3 and ISO/IEC JTC1/SC29/WG11, pp. 1-33, Jul. 11-20, 2012, Stockholm, Sweden.
Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, pp. 1-250, Jul. 11-20, 2012, Stockholm, Sweden.
Minhua Zhou and Alexis Michael Tourapis, "Side Activity Report on Slice Header Parsing Overhead Reduction", JCTVC-J0571, Joint Collaborative Team on Video Coding (JCT-VC) of ITU-T SG16 WP3 and ISO/IEC JTC1/SC29/WG11, pp. 1-4, Jul. 11-20, 2012, Stockholm, Sweden.
Minhua Zhou and Alexis Michael Tourapis, "Side Activity Report on Slice Header Parsing Overhead Reduction", JCTVC-J0571 presentation, Joint Collaborative Team on Video Coding (JCT-VC) of ITU-T SG16 WP3 and ISO/IEC JTC1/SC29/WG11, pp. 1-7, Jul. 11-20, 2012, Stockholm, Sweden.
Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, pp. 1-293, Oct. 10-19, 2012, Shanghai, China.
Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, pp. 1-260, Apr. 27-May 7, 2012, Geneva, Switzerland.
Benjamin Bross et al, "WD5: Working Draft 5 of High-Efficiency Video Coding", JCTVC-G1103-D9, Joint Collaborative Team on Video Coding (JCT-VC) of ITU-T SG16 WP3 and ISO/IEC JTC1/SC29/WG11, pp. 1-223, Nov. 21-30, 2011, Geneva, Switzerland.
Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, pp. 1-249, Nov. 21-30, 2011, Geneva, Switzerland.

* cited by examiner

METHOD AND SYSTEM FOR REDUCING SLICE HEADER PARSING OVERHEAD IN VIDEO CODING

CROSS-REFERENCE TO RELATED APPLICATIONS

This application is a continuation of U.S. application Ser. No. 13/913,291, filed Jun. 7, 2013 (now U.S. Pat. No. 9,473,769), claims benefit of U.S. Provisional Patent Application Ser. No. 61/657,118, filed Jun. 8, 2012, U.S. Provisional Patent Application Ser. No. 61/659,059, filed Jun. 13, 2012, U.S. Provisional Patent Application Ser. No. 61/667,024, filed Jul. 2, 2012, U.S. Provisional Patent Application Ser. No. 61/667,097, filed Jul. 2, 2012, U.S. Provisional Patent Application Ser. No. 61/670,294, filed Jul. 11, 2012, and U.S. Provisional Patent Application Ser. No. 61/671,961, filed Jul. 16, 2012, all of which are incorporated herein by reference in their entirety.

BACKGROUND OF THE INVENTION

Field of the Invention

Embodiments of the present invention generally relate to reduction of slice header parsing overhead in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

Similar to prior video coding standards, a picture may be subdivided into one or more independently decodable slices. A slice header is transmitted for each slice. This header contains high-level parameters for decoding the data in the associated slice. Such parameters may include, for example, a picture order counter, reference picture parameter sets, SAO (sample adaptive offset) control parameters, reference picture list parameters and modification parameters, de-blocking filter control parameters, a weighted prediction table, in-loop filter slice on/off control flag, and sub-stream entries, etc.

In typical video decoder designs, slice header parsing is implemented in software for flexibility and error resiliency reasons and can be a processing bottleneck for large slice headers. Tests have shown that even with a powerful processor, the worst case slice parsing overhead may be around 30 MHz for 1080p@30. For a 1080p@120 decoder at 300 MHz, the slice header parsing would account for about 40% overall cycle count for the decoder, which is way too high when considering that the typical margin for high-level syntax paring is only around 10% of overall decoder cycle budget. Further, even if the slice header decoding is implemented in hardware, large slice header sizes can still create pipeline bubbles that slow down the decoder significantly. Therefore, it is desirable to reduce the overhead of slice header parsing.

SUMMARY

Embodiments of the present invention relate to methods, apparatus, and computer readable media that reduce slide header parsing overhead as compared to the prior art. In one aspect, a method for encoding a picture of a video sequence in a bit stream is provided that includes determining weighting factors that may be used for weighted prediction in encoding at least one slice of the picture, wherein a total number of the weighting factors is constrained to not exceed a predetermined threshold number of weighting factors, wherein the threshold number is less than a maximum possible number of weighting factors, and signaling weighted prediction parameters including the weighting factors in a slice header in the bit stream.

In one aspect, a method for decoding a slice of picture from a bit stream when weighted prediction is enabled for the slice is provided that includes decoding a first sequence of luminance weight flags corresponding to a first plurality of reference pictures from the bit stream, decoding a first sequence of chrominance weight flags corresponding to the first plurality of reference pictures from the bit stream, wherein the encoded first sequence of chrominance weight flags follows the encoded first sequence of luminance weight flags in the bit stream, decoding luminance weighting factors for each luminance weight flag of the first sequence of luminance weight flags that is set to indicate weighted prediction of a luminance component of a corresponding reference picture is enabled, wherein the encoded luminance weighting factors follow the encoded first sequence of chrominance weight flags in the bit stream, and decoding chrominance weighting factors for each chrominance weight flag of the first sequence of chrominance weight flags that is set to indicate weighted prediction of chrominance components of a corresponding reference picture is enabled, wherein the encoded chrominance weighting factors follow the encoded luminance weighting factors in the bit stream.

In one aspect, a method for encoding a picture of a video sequence in a bit stream is provided that includes determining weighted prediction parameters for a first plurality of reference pictures, wherein the weighted prediction parameters may be used for weighted prediction in encoding at least one slice of the picture, and wherein the weighting prediction parameters include first luminance weight flags, first luminance weighting factors, first chrominance weight flags, and first chrominance weighting factors for the first plurality of reference pictures, and signaling the weighted prediction parameters in a slice header in the bit stream. The signaling of the weighted prediction parameters includes signaling the first luminance weight flags sequentially in the bit stream, signaling the first chrominance weight flags sequentially in the bit stream following the first luminance weight flags, signaling the first luminance weighting factors sequentially in the bit stream following the first chrominance weight flags, and signaling the first chrominance weighting factors sequentially in the bit stream following the first luminance weighting factors.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Figure 1:
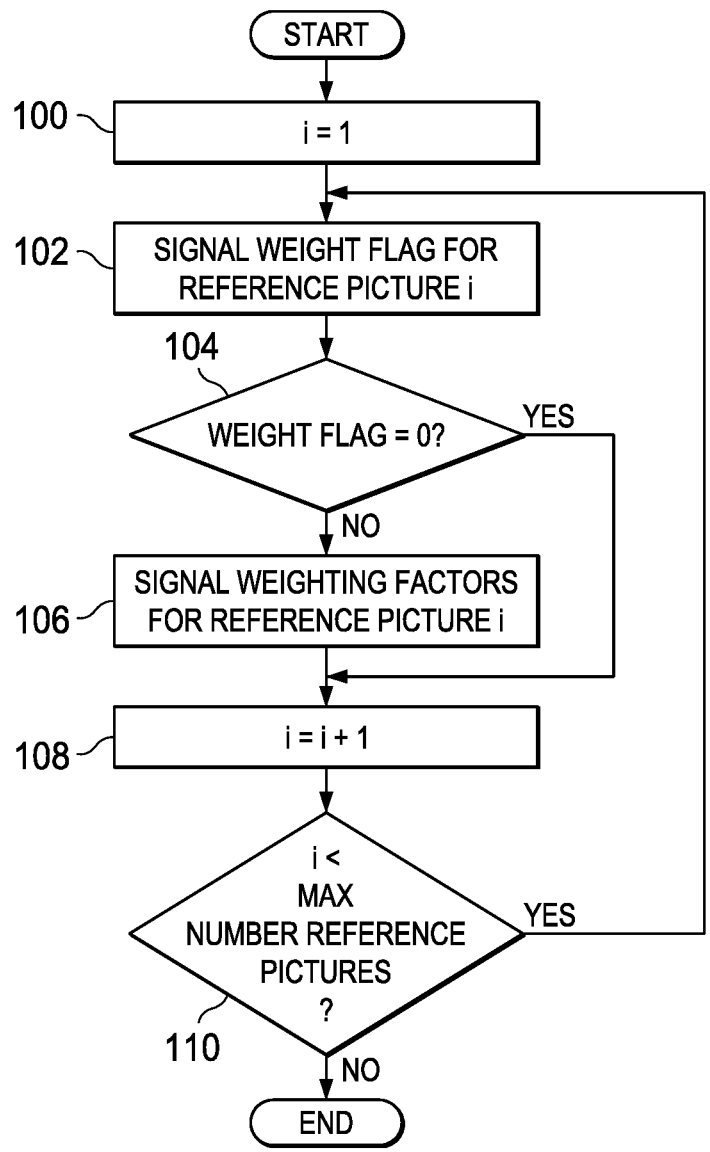
FIG. 1 is a flow diagram of a prior art method.

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T 5G16 WP3 and ISO/IEC JTC1/5C29/WG1, San Jose, Calif., Feb. 1-10, 2012, ("HEVC Draft 6"), B. Bross, et al., "High Efficiency Video Coding (HEVC) Text Specification Draft 7," JCTVC-11003_d9, Joint Collaborative Team on Video Coding (JCT-VC) of ITU-T 5G16 WP3 and ISO/IEC JTC1/5C29/WG1, Geneva, CH, April 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T 5G16 WP3 and ISO/IEC JTC1/5C29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T 5G16 WP3 and ISO/IEC JTC1/5C29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T 5G16 WP3 and ISO/IEC JTC1/5C29/WG1, Geneva, CH, Jan. 14-23, 2013 ("HEVC Draft 10").

As previously mentioned, reducing the overhead of parsing parameters in slice headers is desirable. In the prior art HEVC specification (HEVC Draft 7), the parsing intensive parameters defined in the slice header may include a weighted prediction table containing various parameters for performing weighted prediction on LCUs in the associated slice. As is well known, weighted prediction is a prediction option that allows an encoder to specify the use of weights and offsets relative to reference pictures when performing motion compensation. This prediction option may provide a significant performance improvement for cases such as fade-to-black, fade-in, and cross-fade transitions. In general, the principle of weighted prediction is to replace an inter-prediction signal P with a linear weighted prediction signal P' (with weight w and offset o) where for uniprediction, P'=w×P+o and for biprediction, P'=(w0×P0+o0+w1×P1+o1)/2. The applicable weights and offsets are determined by the encoder, using any suitable technique and are conveyed within the compressed bit stream as defined by HEVC.

Weights and offsets may be signaled as part of the weighted prediction table for each of the three color components and for both forward and backward reference pictures. HEVC currently allows a maximum of 16 forward (list 0) reference pictures and 16 backward (list 1) reference pictures for inter-prediction. Thus, in the worst case, 96 weights and 96 offsets may be included in a weighted prediction table in a slice header. In addition, when weighted prediction is enabled, weight flags are signaled in the weighted prediction table for each reference picture indicating whether or not weighted prediction is to be used for the reference picture, i.e., indicating whether or not a weight and offset (weighting factors) are signaled for luminance and/or chrominance components of a reference picture.

More specifically, for forward prediction, a luminance weight flag and a chrominance weight flag are signaled for each possible list 0 reference picture indicating whether or not weighting factors for the luminance (luminance) component and/or the chrominance (chrominance) components of list 0 prediction for the reference picture are present. For bi-prediction, in addition to the list 0 luminance and chrominance weight flags, a luminance weight flag and a chrominance weight flag are signaled for each possible list 1 reference picture indicating whether or not weighting factors for the luminance component and/or the chrominance components of list 1 prediction are present. Thus, in the worst case, a weighted prediction table may include 64 of these weight flags.

Further, as specified in the prior art HEVC specification (HEVC Draft 7), the signaling of these flags is interleaved with the weighting factors. FIG. 1 is a method illustrating the prior art interleaved signaling of the weight flags and the weighting factors for one set of weight flags and weight factors. For a P slice, this method is first performed for luminance components for list 0 reference pictures and then for chrominance components for list 0 reference pictures. For a B slice, this method is first performed as for a P slice, then for luminance components for list 1 reference pictures, and then for chrominance components for list 1 reference pictures.

The method is described assuming weight flags and weighting factors for the luminance components of list 0 reference pictures are being signaled. One of ordinary skill in the art, having benefit of this description, will understand signaling for chrominance components of list 0 reference pictures, and signaling for luminance and chrominance components of list 1 reference pictures. In this method, a counter i initialized 100. This counter indicates a particular reference picture in list 0. A weight flag is signaled 104 for reference picture in list 0. If the weight flag associated with the reference picture is zero 104, indicating that there are no weighting factors for the reference picture, then the counter is incremented 108, and information for the next reference picture in the list, if any 110, is signaled. If the weight flag associated with the reference picture is not zero 104, indicating that there are weighting factors for the reference picture, the weighting factors associated with reference picture i are signaled 106. Note that if chrominance component information is being signaled, two sets of weighting factors are signaled at step 106, one for Cb and one for Cr. Then the counter is incremented 108, and information for the next reference picture in the list, if any 110, is signaled.

Although the use of weighted prediction, and thus the signaling of weighted prediction parameters in slice headers, is optional, in the worst case, a picture can contain a maximum number of slices permitted for the profile and level, and all the slices in the picture can include the full complement of weight flags and weighting factors. The parsing of such a group of slice headers may not be possible in real-time. Further, interleaving the signaling of the weight flags with the weighting factors may increase the processing overhead in a decoder.

Embodiments of the invention provide for restricting the number of weighting factors that can be signaled for weighted prediction in a slice header in order to limit the parsing overhead. More specifically, in some embodiments, the number of weighting factors that can be signaled in a slice header is constrained to not exceed a predetermined threshold number of weighting factors that is less than the maximum possible number of weighting factors. Further, in some embodiments, the signaling of the weight flags is separated from the signaling of the weighting factors rather than being interleaved as in the prior art to allow for more efficient processing of the flags both in an encoder and in a decoder.

Figure 2:
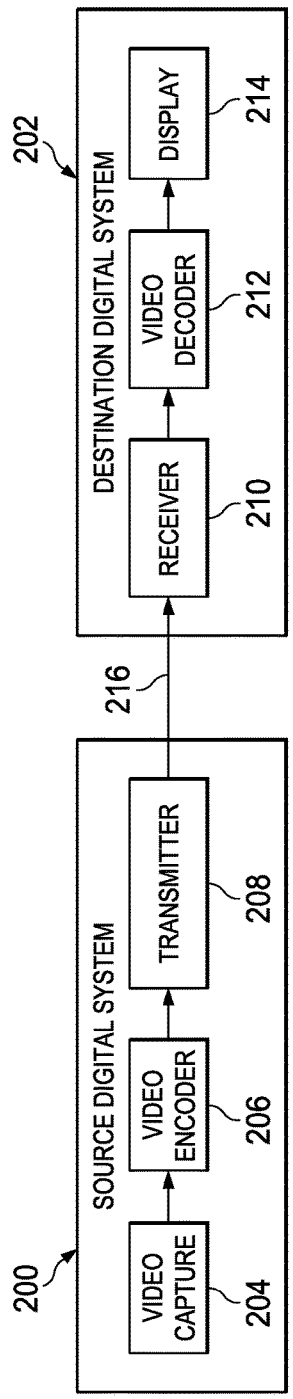
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to perform weighted prediction and signaling of weighted prediction parameters in slice headers during the encoding process as described herein. An embodiment of the video encoder component 206 is described in more detail herein in reference to FIG. 3.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to decode weighted prediction parameters from slice headers during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3A:
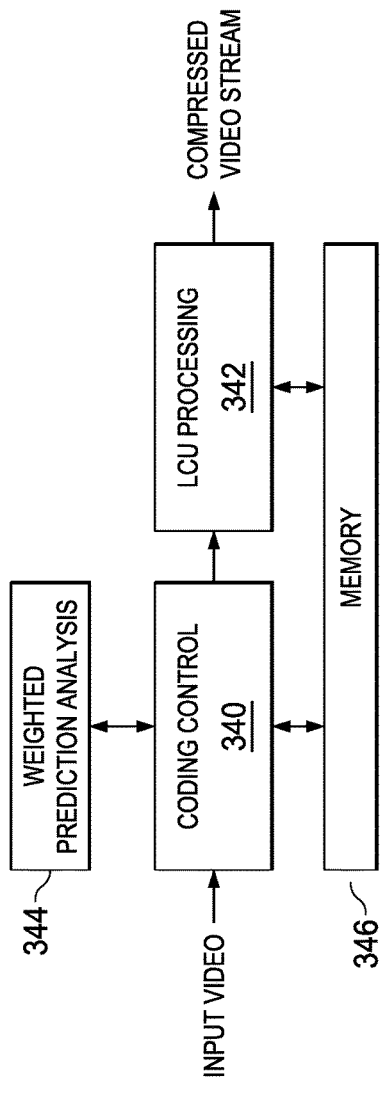
FIGS. 3A and 3B are a block diagram of an example video encoder.
Figure 3B:
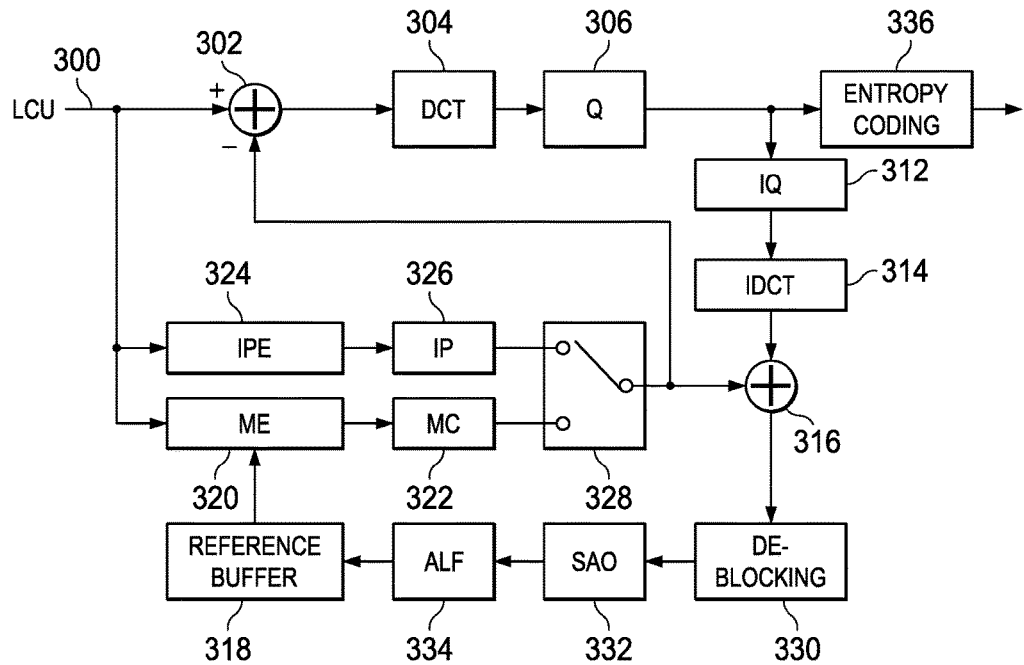

FIGS. 3A and 3B show block diagrams of an example video encoder providing weighted prediction. For simplicity of explanation, the description of the example video encoder assumes that the analysis as to whether or not to enable weighted prediction and the determination of the weighting factors (weights and offsets) are performed at the picture level. One of ordinary skill in the art will understand embodiments in which analysis and weighting factor determination may be performed in other suitable ways and/or at other levels in the video stream. For example, many suitable techniques have been documented for weighted prediction in H.264/AVC, such as the region-based approach described in D. Kwon and H. Kim, "Region-Based Weighted Prediction for Real-Tim H.264 Encoder," 2011 IEEE International Conference on Consumer Electronics (ICCE), pp. 47-48, Jan. 9-12, 2011, Las Vegas, Nev. ("Kwon").

FIG. 3A shows a high level block diagram of the video encoder and FIG. 3B shows a block diagram of the LCU processing component 642 of the video encoder. As shown in FIG. 3A, the video encoder includes a coding control component 340, an LCU processing component 342, a weighted prediction analysis component 344, and a memory 346. The memory 346 may be internal (on-chip) memory, external (off-chip) memory, or a combination thereof. The memory 346 may be used to communicate information between the various components of the video encoder.

An input digital video sequence is provided to the coding control component 340. The coding control component 340 sequences the various operations of the video encoder, i.e., the coding control component 340 runs the main control loop for video encoding. For example, the coding control component 340 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component 340 controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

When weighted prediction is enabled for a picture, i.e., weighted prediction is enabled for one or both of any P slices or B slices in the picture, the weighted prediction analysis component 344 determines whether or not luminance and/or chrominance weighted prediction is to be used for each applicable reference picture and sets the corresponding weight flags as appropriate. The applicable reference pictures are the list 0 reference pictures if weighed prediction for P slices is enabled, and the list 0 and list 1 reference pictures if weighted prediction for B slices is enabled. Further, if weighted prediction is to be used for luminance and/or chrominance for a reference picture, the weighted prediction analysis component 344 determines the weighting factors to be used. Note that enabling weighted prediction for P slices and/or B slices is an encoder option and an encoder may use any suitable technique for deciding whether or not weighted prediction for one or both slice types is to be enabled.

Rather than allowing weighted prediction to possibly be enabled for both luminance and chrominance for all applicable reference pictures as in the prior art, the weighted prediction analysis component 344 limits the total number of weighting factors for a picture to be less to be less than or equal to a predetermined threshold number of weighting factors, e.g., 24, specified by HEVC. The operation of the weighted prediction analysis component 344 is explained in more detail in reference to the methods of FIGS. 5 and 6 below. The weighted prediction analysis component 344 provides the luminance and chrominance weight flags, and the associated weighting factors to the coding control component 340 for communication to various components of the LCU processing component 342 as needed.

FIG. 3B is a block diagram of the LCU processing component 342. The LCU processing component 342 receives LCUs 300 of the input video sequence from the coding control component and encodes the LCUs 300 under the control of the coding control component 340 to generate the compressed video stream. The LCUs 300 in each picture are processed in row order. The LCUs 300 from the coding control component are provided as one input of a motion estimation component (ME) 320, as one input of an intra-prediction estimation component (IPE) 324, and to a positive input of a combiner 302 (e.g., adder or subtractor or the like). Further, although not specifically shown, the prediction mode of each picture as selected by the coding control component 340 is provided to a mode decision component 328 and the entropy coding component 336.

The storage component 318 provides reference data to the motion estimation component 320 and to the motion compensation component 322. The reference data may include one or more previously encoded and decoded pictures, i.e., reference pictures. Both list 0 and list 1 reference pictures may be stored by the storage component 318.

The motion estimation component 320 provides motion data information to the motion compensation component 322 and the entropy coding component 336. More specifically, the motion estimation component 320 performs tests on CUs in an LCU based on multiple inter-prediction modes (e.g., skip mode, merge mode, and normal or direct inter-prediction), PU sizes, and TU sizes using reference picture data from storage 318 to choose the best CU partitioning, PU/TU partitioning, inter-prediction modes, motion vectors, etc. based on coding cost, e.g., a rate distortion coding cost. To perform the tests, the motion estimation component 320 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. If weighted prediction is enabled for the current picture, any weights and offsets for reference pictures generated by the weighted prediction analysis component 344 are applied as appropriate. For example, the size of prediction error between the current PU and the reference PU may be computed as the sum of absolute difference between the current PU and the weighted reference PU. The motion estimation component 320 provides the motion vector (MV) or vectors and the prediction mode for each PU in the selected CU partitioning to the motion compensation component (MC) 322.

The motion compensation component 322 receives the selected inter-prediction mode and mode-related information from the motion estimation component 320 and generates the inter-predicted CUs. If weighted prediction is enabled for the current picture and for the particular reference picture or pictures used for inter-prediction, the weights and offsets for the reference picture or pictures generated by the weighted prediction analysis component 344 are applied in generating the inter-predicted CU. The inter-predicted CUs are provided to the mode decision component 328 along with the selected inter-prediction modes for the inter-predicted PUs and corresponding TU sizes for the selected CU/PU/TU partitioning. The coding costs of the inter-predicted CUs are also provided to the mode decision component 328.

The intra-prediction estimation component 324 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 324 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 324 provides the selected intra-prediction modes for the PUs, and the corresponding TU sizes for the selected CU partitioning to the intra-prediction component (IP) 326. The coding costs of the intra-predicted CUs are also provided to the intra-prediction component 326.

The intra-prediction component 326 (IP) receives intra-prediction information, e.g., the selected mode or modes for the PU(s), the PU size, etc., from the intra-prediction estimation component 324 and generates the intra-predicted CUs. The intra-predicted CUs are provided to the mode decision component 328 along with the selected intra-prediction modes for the intra-predicted PUs and corresponding TU sizes for the selected CU/PU/TU partitioning. The coding costs of the intra-predicted CUs are also provided to the mode decision component 328.

The mode decision component 328 selects between intra-prediction of a CU and inter-prediction of a CU based on the intra-prediction coding cost of the CU from the intra-prediction component 326, the inter-prediction coding cost of the CU from the motion compensation component 322, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 336.

The output of the mode decision component 328, i.e., the predicted PUs, is provided to a negative input of the combiner 302 and to the combiner 338. The associated transform unit size is also provided to the transform component 304. The combiner 302 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 304 performs block transforms on the residual CUs to convert the residual pixel values to transform coefficients and provides the transform coefficients to a quantize component 306. More specifically, the transform component 304 receives the transform unit sizes for the residual CU and applies transforms of the specified sizes to the CU to generate transform coefficients. Further, the quantize component 306 quantizes the transform coefficients based on quantization parameters (QPs) and quantization matrices provided by the coding control component and the transform sizes and provides the quantized transform coefficients to the entropy coding component 336 for coding in the bit stream.

The entropy coding component 336 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, slice headers, flags indicating the CU/PU/TU partitioning of an LCU, the prediction modes for the CUs, and the quantized transform coefficients for the CUs. The entropy coding component 336 also entropy encodes relevant data from the in-loop filters, such as the SAO parameters. Further, the entropy coding component 336 encodes weighted prediction parameters in slice headers of P or B slices when weighted prediction is enabled for P slices and/or B slices in a current picture. Theses parameters include the weight flags and weighting factors generated by the weighted prediction analysis component 344. A method for signaling the weight flags and weighting factors in a slice header that may be used by the entropy coding component 336 is described below in reference to FIG. 7.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 312, which outputs a reconstructed version of the transform result from the transform component 304. The dequantized transform coefficients are provided to the inverse transform component (IDCT) 314, which outputs estimated residual information representing a reconstructed version of a residual CU. The inverse transform component 314 receives the transform unit size used to generate the transform coefficients and applies inverse transform(s) of the specified size to the transform coefficients to reconstruct the residual values. The reconstructed residual CU is provided to the combiner 338.

The combiner 338 adds the original predicted CU to the residual CU to generate a reconstructed CU, which becomes part of reconstructed picture data. The reconstructed picture data is stored in a buffer (not shown) for use by the intra-prediction estimation component 324.

Various in-loop filters may be applied to the reconstructed picture data to improve the quality of the reference picture data used for encoding/decoding of subsequent pictures. The in-loop filters may include a deblocking filter 330, a sample adaptive offset filter (SAO) 332, and an adaptive loop filter (ALF) 334. The in-loop filters 330, 332, 334 are applied to each reconstructed LCU in the picture and the final filtered reference picture data is provided to the storage component 318. In some embodiments, the ALF component 334 is not present.

Figure 4:
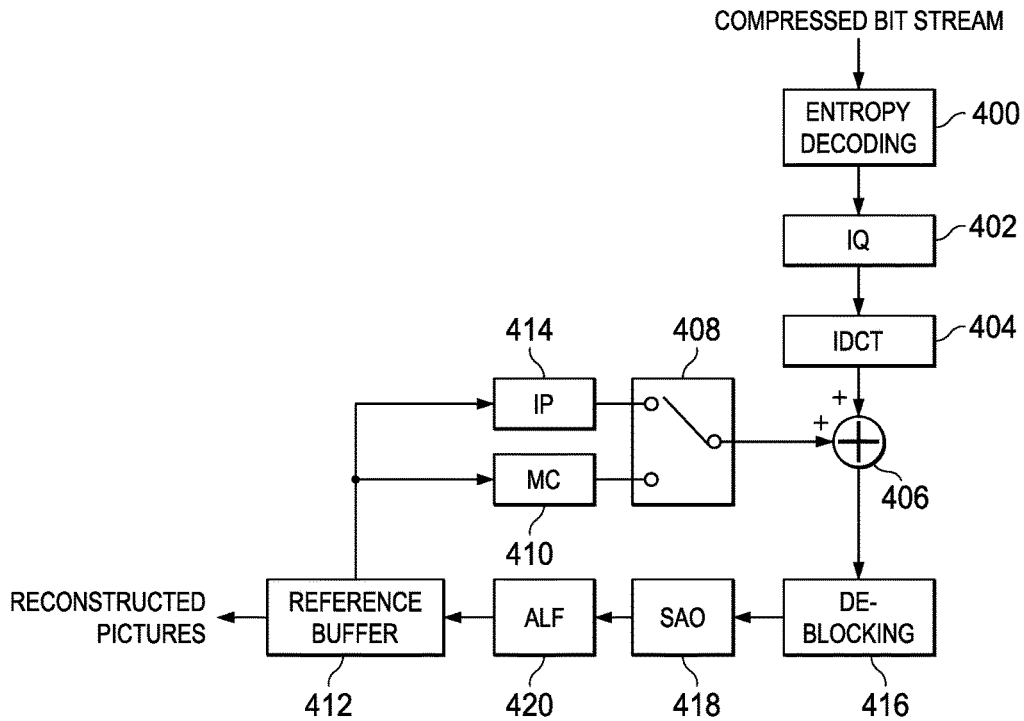
FIG. 4 is a block diagram of an example video decoder.

FIG. 4 is a block diagram of an example video decoder providing decoding of video sequences encoded using weighted prediction. The video decoder operates to reverse the encoding operations, i.e., entropy coding, quantization, transformation, and prediction, performed by the video encoder of FIGS. 3A and 3B to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, weighted prediction parameters, SAO parameters, etc. The decoded syntax elements are passed to the various components of the decoder as needed. For example, decoded prediction modes are provided to the intra-prediction component (IP) 414 or motion compensation component (MC) 410. If the decoded prediction mode is an inter-prediction mode, the entropy decoder 400 reconstructs the motion vector(s) as needed and provides the motion vector(s) to the motion compensation component 410.

The entropy decoding component 400 decodes flags in a picture parameter set that indicate whether or not weighted prediction is enabled for P and/or B slices in the picture. If weighted prediction is enabled for P slices, for each P slice in the picture, the entropy decoding component 400 decodes weight flags and associated weighting factors (if any) for list 0 reference pictures from the slice header, and provides these parameters to the motion compensation component 410. If weighted prediction is enabled for B slices, for each B slice in the picture, the entropy decoding component 400 decodes weight flags and associated weighting factors (if any) for list 0 and list 1 reference pictures from the slice header, and provides these parameters to the motion compensation component 410. A method for decoding weight flags and associated weighting factors that may be performed by the entropy decoding component 400 is described herein in reference to FIG. 8.

The inverse quantize component (IQ) 402 de-quantizes the quantized transform coefficients of the CUs. The inverse transform component 404 transforms the frequency domain data from the inverse quantize component 402 back to the residual CUs. That is, the inverse transform component 404 applies an inverse unit transform, i.e., the inverse of the unit transform used for encoding, to the de-quantized residual coefficients to produce reconstructed residual values of the CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from the storage component 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU. Further, if weighted prediction is enabled for P and/or B slices of the current picture, the motion compensation component 410 applies weights and offsets to the reference data as appropriate during the generation of the predicted PU.

The intra-prediction component 414 receives reconstructed samples from previously reconstructed PUs of a current picture from the storage component 412 and performs the intra-prediction computed by the encoder as signaled by an intra-prediction mode transmitted in the encoded video bit stream using the reconstructed samples as needed to generate a predicted PU.

The addition component 406 generates a reconstructed CU by adding the predicted PUs selected by the mode switch 408 and the residual CU. The output of the addition component 406, i.e., the reconstructed CUs, is stored in the storage component 412 for use by the intra-prediction component 414.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 416, a sample adaptive offset filter (SAO) 418, and an adaptive loop filter (ALF) 420. The in-loop filters may be applied on an LCU-by-LCU basis and the final filtered reference picture data is provided to the storage component 412. In some embodiments, the ALF component 420 is not present.

Figure 5:
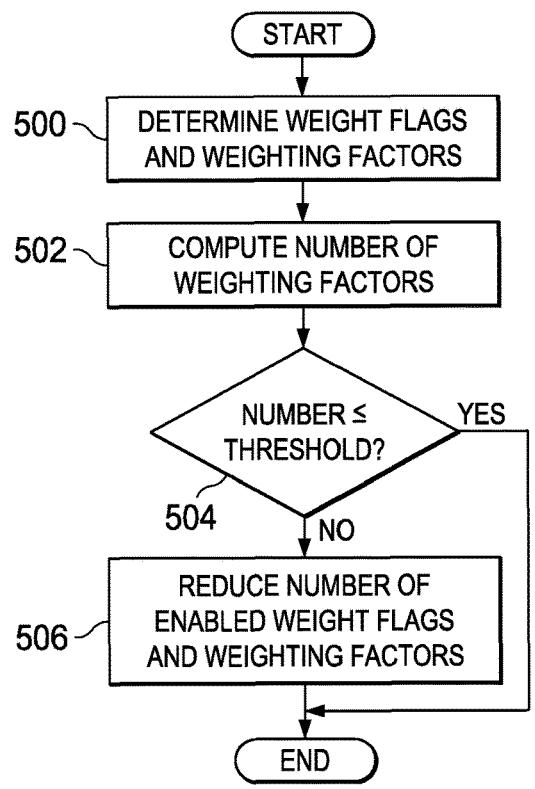
FIGS. 5-8 are flow diagrams of methods.

FIG. 5 is a flow diagram of a method for determining weighted prediction parameters for a picture that may be used, for example, by the weighted prediction analysis component 344 of the encoder of FIGS. 3A and 3B. This method assumes that weighted prediction has been enabled for P and/or B slices in the picture.

Initially, weight flags and weighting factors (weights and offsets) for weighted prediction are determined 500. If weighted prediction is enabled for P slices, luminance and chrominance weighting flag values, and weighting factors (if weighted prediction is enabled for a reference picture) are determined for list 0 reference pictures. If weighted prediction is enabled for B slices, luminance and chrominance weighting flag values, and weighting factors (if weighted prediction is enabled for a reference picture) are determined for both list 0 reference pictures and list 1 reference pictures. A method for determining weight flags and weighting factors for a picture that may be used in some embodiments is described herein in reference to FIG. 6.

After the weight flag values are determined, the total number of weighting factors is computed 502. The total number of weighting factors may be computed, for example, as the sum of the number of enabled luminance weight flags and 2× the number of enabled chrominance weight flags. More specifically, if weighted prediction is enabled for P slices, the total number of weighting factors for the list 0 reference pictures may be computed as the sum of the number of enabled list 0 luminance weight flags and 2× the number of enabled list 0 chrominance weight flags. If weighted prediction is enabled for B slices, the total number of weighting factors for both the list 0 and the list 1 reference pictures may be computed as the sum of the number of enabled list 0 luminance weight flags, 2× the number of enabled list 0 chrominance weight flags, the number of enabled list 1 luminance weight flags, and 2× the number of enabled list 1 chrominance weight flags. A weight flag is enabled if it is set to indicate that weighted prediction is to be used for the associated color component(s) of a reference picture. Further, if a luminance weight flag is enabled, there are luminance weighting factors for the associated reference picture; otherwise, there are no luminance weighting factors for the associated reference picture. If a chrominance weight flag is enabled, there are also Cb and Cr weighting factors for the associated reference picture; otherwise, there are no chrominance weighting factors for the associated reference picture.

The number of weighting factors is then compared 504 to a predetermined threshold that indicates the maximum number of weighting factors allowed. The value of this threshold is set by HEVC and may be any suitable value. In some embodiments, the value of the threshold is 24.

If the total number of weighting factors does not exceed the threshold, the method terminates. If the total number of weighting factors exceeds the threshold, the number of weighting factors is reduced 506 by selectively disabling some of the enabled weight flags and discarding the associated weighting factors. Any suitable technique may be used to determine which weighting factors are to be discarded. For example, some or all of any chrominance weighting factors may be discarded and the associated enabled chrominance weight flags disabled to reduce the number of weighting factors. In another example, some of the luminance and chrominance weighting factors for reference pictures of higher reference picture index values may be discarded and their associated weight flags disabled to reduce the number of weighting factors. After the number of weighting factors is reduced to at or below the threshold, the method terminates.

Figure 6:
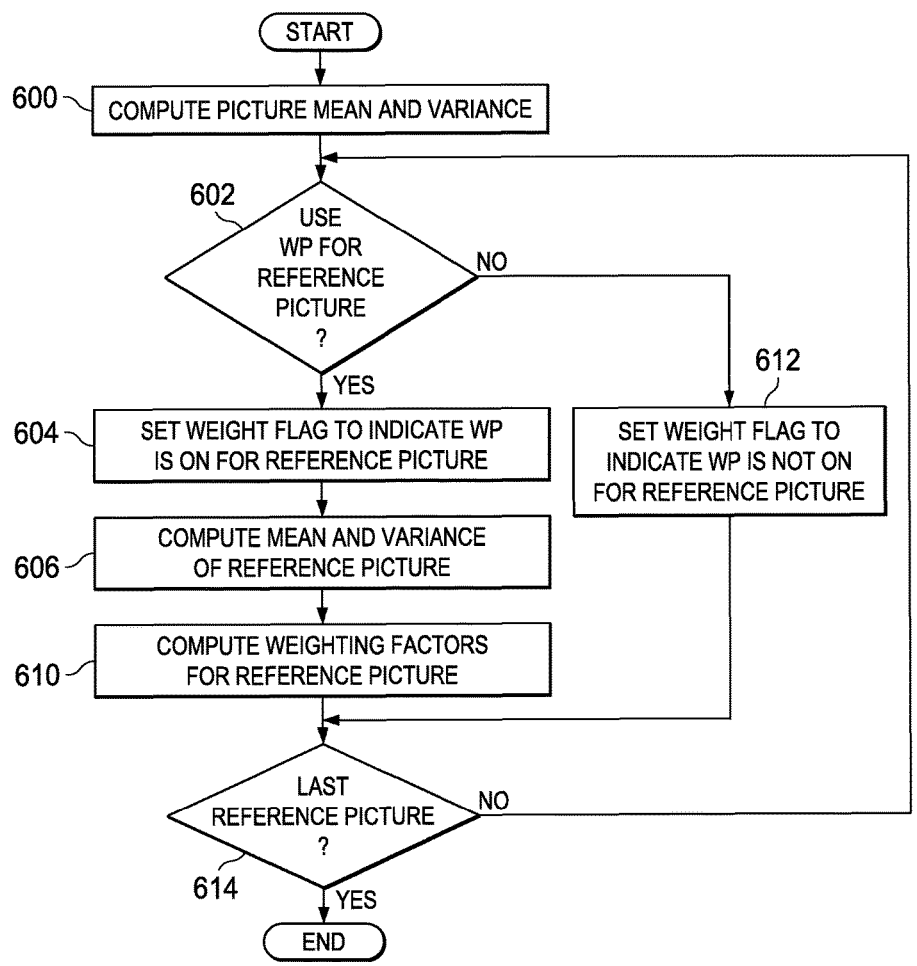

FIG. 6 is a flow diagram of a method for determining weight flag values and weighting factors for a picture. If weighted prediction is enabled for P slices, the method is executed twice, once to determine luminance weight flag values and weighting factors for list 0 reference pictures and once to determine chrominance weight flag values and weighting factors for list 0 reference pictures. If weighted prediction is enabled for B slices, the method is executed four times, once to determine luminance weight flag values and weighting factors for list 0 reference pictures, once to determine chrominance weight flag values and weighting factors for list 0 reference pictures, once to determine luminance weight flag values and weighting factors for list 1 reference pictures, and once to determine chrominance weight flag values and weighting factors for list 1 reference pictures.

Initially, the mean and variance of the picture are computed 600 for use in determining the weighting factors. If the method is being performed to determine luminance weight flag values and weighting factors, the mean and variance of the luminance component of the picture are computed. If the method is being performed to determine chrominance weight flag values and weighting factors, the mean and variance of each of the Cb and Cr components of the picture are computed.

An analysis is then performed to determine whether or not weighted prediction is to be used 602 for an initial reference picture in the reference picture list being processed. Any suitable analysis technique may be used. For example, a region based approach to detecting changes in global brightness as described in Kwon may be used. If the result of the analysis is that weighted prediction is not to be used, the weight flag for the reference picture is set 612 to indicate that weighted prediction is not enabled for the reference picture, and processing continues with the next reference picture in the reference picture list, if any 614.

If the result of the analysis is that weighted prediction is to be used, the weight flag for the reference picture is set 604 to indicate that weighted prediction is enabled for the reference picture. The mean and variance of the reference picture are also computed 606 for use in determining the weighting factors. If the method is being performed to determine luminance weight flag values and weighting factors, the mean and variance of the luminance of the reference picture are computed. If the method is being performed to determine chrominance weight flag values and weighting factors, the mean and variance of each of Cb and Cr of the reference picture are computed.

Weighting factors are then computed for the reference picture. In general, the weight W and offset O for a color component of a reference picture may be computed as $$W=(V(\text{curr})/V(\text{ref}))<<\text{shift}$$

$$O=M(\text{curr})-((W*M(\text{ref})+2^{(\text{shift}-1)})>>\text{shift})$$

where V(curr) is the variance of the color component for the picture, M(curr) is the mean of the color component for the picture, V(ref) is the variance of the color component for the reference picture, M(ref) is the mean of the color component for the reference picture, and shift is the base 2 logarithm of the denominator for all list 0 and list 1 weighting factors in the reference picture list. Note that luminance and chrominance color components may use different denominators which are signaled in bit stream. If the method is being performed to determine chrominance weight flag values and weighting factors, weighted factors for both Cb and Cr are computed. After the weighting factors are computed, processing continues with the next reference picture, if any 614.

Figure 7:
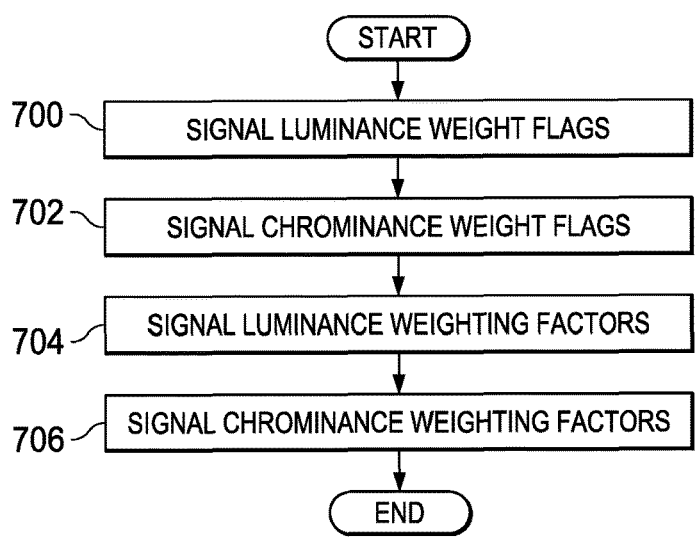

FIG. 7 is a flow diagram of a method for signaling weight flags and weighting factors for a reference picture list in a slice header that may be used, for example, by the entropy coding component 336 of the encoder of FIGS. 3A and 3B. If weighted prediction is enabled for P slices, the method is executed one time to signal the weight flags and weighting factors for the list 0 reference pictures. If weighted prediction is enabled for B slices, the method is executed twice, once to signal the weight flags and weighting factors for the list 0 reference pictures and once to signal the weight flags and weighting factors for the list 1 reference pictures.

First, the luminance weight flags for the reference picture list are signaled 700 in the compressed bit stream. The chrominance weight flags for the reference picture list are then signaled 702 in the compressed bit stream immediately following the luminance weight flags. Then, the luminance weighting factors corresponding to any enabled luminance weight flags are signaled 704 in the compressed bit stream. Finally, the chrominance weighting factors corresponding to any enabled chrominance weight flags are signaled 706 in the compressed bit stream.

Figure 8:
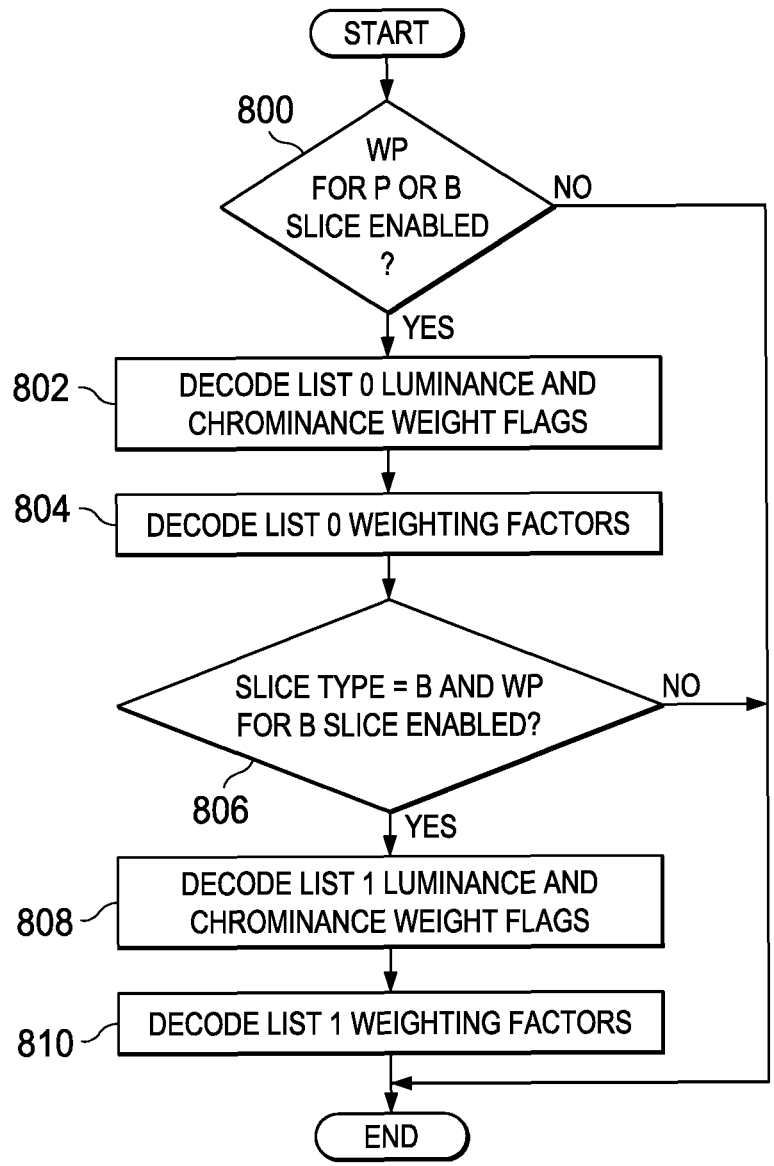

FIG. 8 is a flow diagram of method for decoding weight flags and associated weighting factors in a slice header that may be performed, for example, by the entropy decoding component 400 of the decoder of FIG. 4. Initially, a check is made to determine if weighted prediction (WP) is enabled 900 for P or B slices in the current picture. As previously described, such enabled is signaled in the bit stream in the picture parameter set. If weighted prediction is not enabled, the method terminates.

If weighted prediction is enabled for P or B slices, luminance and chrominance weight flags for list 0 reference pictures are decoded 802 from the slice header. More specifically, luminance weight flags are decoded, followed by chrominance weight flags. Weighting factors for any enabled weight flags for the list 0 reference pictures are then decoded 804 from the slice header. More specifically, luminance weighting factors are decoded, followed by chrominance weighting factors.

If the slice type is B and weighted prediction is enabled for B slices 806, then luminance and chrominance weight flags for list 1 reference pictures are decoded 808 from the slice header. More specifically, luminance weight flags are decoded, followed by chrominance weight flags. Weighting factors for any enabled weight flags for the list 1 reference pictures are then decoded 810 from the slice header. More specifically, luminance weighting factors are decoded, followed by chrominance weighting factors. If the slice type is not B or weighted prediction is not enabled for B slices 806, the method terminates.

Figure 9:
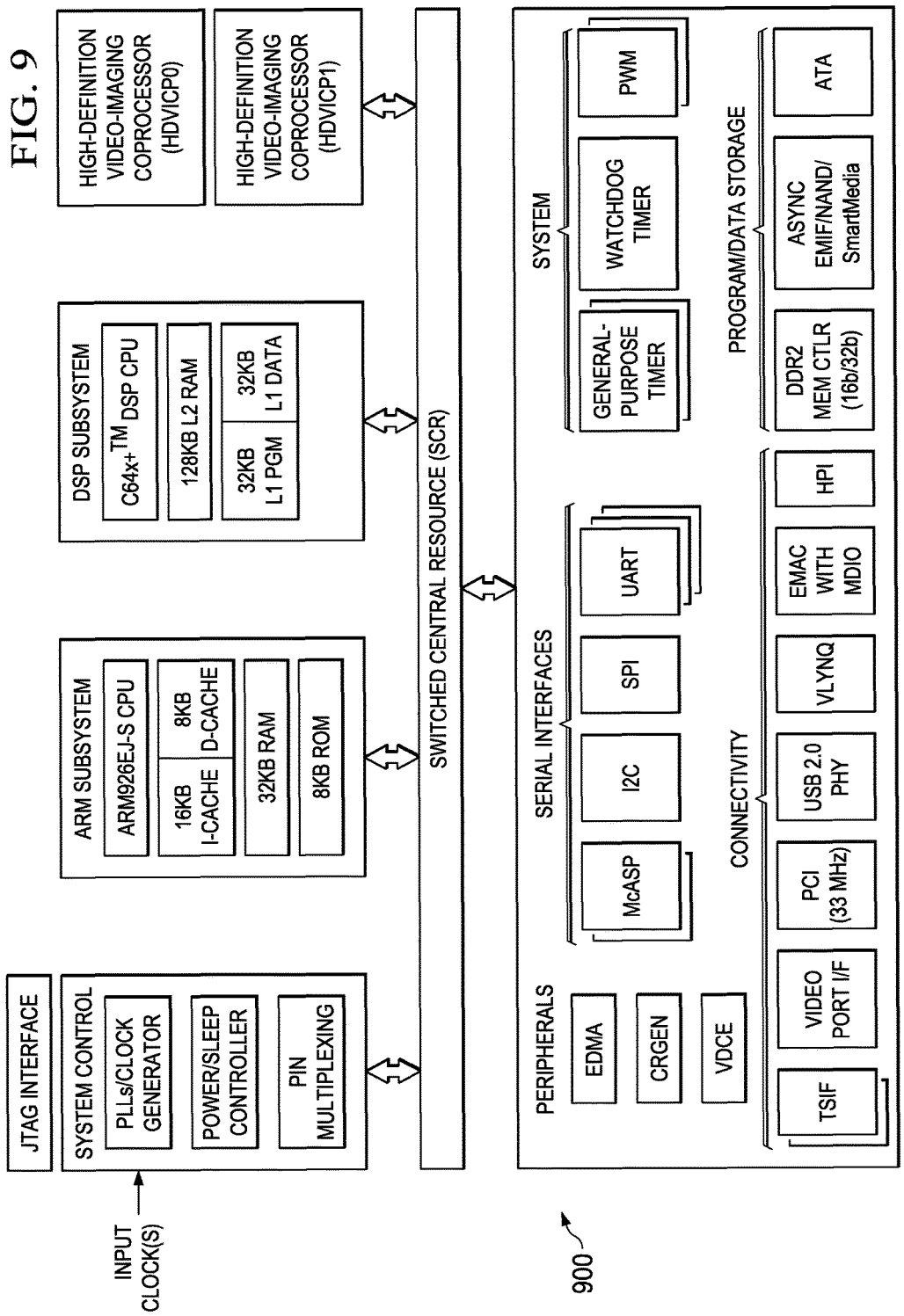
FIG. 9 is a block diagram of an illustrative digital system.

FIG. 9 is a block diagram of an example digital system suitable for use as an embedded system that may be configured to perform weighted prediction and signaling of weighted prediction parameters in slice headers as described herein during encoding of a video stream and/or to decode weighted prediction parameters from slice headers during decoding of an encoded video bit stream as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 900 is a programmable platform designed to meet the processing needs of applications such as video encode/decode/transcode/transrate, video surveillance, video conferencing, set-top box, medical imaging, media server, gaming, digital signage, etc. The SoC 900 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 900 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 900, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 900 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 9, the SoC 900 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 900 may be configured to perform weighted prediction and signaling of weighted prediction parameters in slice headers as described herein during encoding of a video stream and/or to decode weighted prediction parameters from slice headers during decoding of an encoded video bit stream as described herein. For example, the coding control of the video encoder of FIGS. 3A and 3B may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. Similarly, at least some of the computational operations of the various components of the video decoder of FIG. 4, including entropy decoding, inverse quantization, inverse transformation, intra-prediction, and motion compensation may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, while embodiments have been described herein in which weighted prediction parameters are determined at the picture level, one of ordinary skill in the art will understand embodiments in which such parameters may be replaced at the slice level. That is, the picture level parameters are treated as default parameters and may be overridden at the slice level. In such embodiments, the weighting factors for slices in which the default parameters are replaced by slice specific parameters are still limited by the threshold.

In another example, while embodiments have been described herein in which weight flags and weighting factors are freely determined without considering the threshold, and then "pruned" if the threshold is exceeded, one of ordinary skill in the art will understand embodiments in which other suitable techniques for ensuring that the threshold is not exceeded are used. For example, the number of weighting factors generated or the number of weight flags may be monitored on-the-fly, and if the threshold is reached before all reference pictures have been considered, the process of generating weighting factors may be terminated and weight flags for any remaining reference pictures set to indicated that weighted prediction is not enabled.

In another example, while embodiments have been described herein in which weighting factors are determined based on means and variances of a picture and a reference picture, one of ordinary skill in the art will understand embodiments in which other suitable techniques for determining weighting factors are used.

In another example, while embodiments have been described herein in which a reference picture is analyzed to determine whether or not weighted prediction is to be used prior to enabling a weight flag and computing weighting factors for the reference picture, one of ordinary skill in the art will understand embodiments in which weighting factors for a reference picture are first determined and then a decision is made based on the efficacy of the weighting factors as to whether or not weighted prediction is to be used for the reference picture. For example, a technique such as one of those described in P. Bordes, "Weighted Prediction," JCTVC-F265, Joint Collaborative Team on Video Coding (JCT-VC) of ITU-T SG16 WP3 and ISO/IEC JTC1/SC29/WG1, Torino, IT, Jul. 14-22, 2011 may be used.

In another example, while embodiments have been described herein which a single chrominance weight flag is used to indicate whether or not weighted prediction is to be used for both chrominance components of a reference picture, one of ordinary skill in the art will understand embodiments in which a separate weight flag is used for each chrominance component.

In another example, while embodiments have been described herein assuming that both luminance and chrominance components are present for pictures and references pictures, one of ordinary skill in the art will understand embodiments in which chrominance components are not present in the video sequence (e.g., for black and white or monochrome video sequences). In such embodiments, chrominance weight flags and weighting factors are not determined and signaled.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

What is claimed is:

1. A method for decoding a slice of picture from a bit stream when weighted prediction is enabled for the slice, the method comprising:
    decoding a first sequence of luminance weight flags corresponding to a first plurality of reference pictures from the bit stream;
    decoding a first sequence of chrominance weight flags corresponding to the first plurality of reference pictures from the bit stream, wherein the encoded first sequence of chrominance weight flags follows the encoded first sequence of luminance weight flags in the bit stream;
    decoding luminance weighting factors for each luminance weight flag of the first sequence of luminance weight flags that is set to indicate weighted prediction of a luminance component of a corresponding reference picture is enabled, wherein the encoded luminance weighting factors follow the encoded first sequence of chrominance weight flags in the bit stream; and
    decoding chrominance weighting factors for each chrominance weight flag of the first sequence of chrominance weight flags that is set to indicate weighted prediction of chrominance components of a corresponding reference picture is enabled, wherein the encoded chrominance weighting factors follow the encoded luminance weighting factors in the bit stream.

2. The method of claim 1, further comprising:
    decoding a second sequence of luminance weight flags corresponding to a second plurality of reference pictures from the bit stream, wherein the second sequence of luminance weight flags follows the encoded chrominance weighting factors corresponding to the first sequence of chrominance weight flags in the bit stream;
    decoding a second sequence of chrominance weight flags corresponding to the second plurality of reference pictures from the bit stream, wherein the encoded second sequence of chrominance weight flags follows the encoded second sequence of luminance weight flags in the bit stream;
    decoding luminance weighting factors for each luminance weight flag of the second sequence of luminance weight flags that is set to indicate weighted prediction of a luminance component of a corresponding reference picture is enabled, wherein the encoded luminance weighting factors corresponding to the second sequence of luminance weight flags follow the encoded second sequence of chrominance weight flags in the bit stream; and
    decoding chrominance weighting factors for each chrominance weight flag of the second sequence of chrominance weight flags that is set to indicate weighted prediction of chrominance components of a corresponding reference picture is enabled, wherein the encoded chrominance weighting factors corresponding to the second sequence of chrominance weight flags follow the encoded luminance weighting factors in the bit stream.

\* \* \* \* \*